United States Patent
Otsuka et al.

(10) Patent No.: US 10,360,090 B2
(45) Date of Patent: Jul. 23, 2019

(54) DETERMINATION METHOD, DETERMINATION APPARATUS, AND RECORDING MEDIUM

(71) Applicant: FUJITSU LIMITED, Kawasaki-shi, Kanagawa (JP)

(72) Inventors: Hiroshi Otsuka, Kawasaki (JP); Yukihiro Watanabe, Kawasaki (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 842 days.

(21) Appl. No.: 14/479,778

(22) Filed: Sep. 8, 2014

(65) Prior Publication Data
US 2015/0142385 A1    May 21, 2015

(30) Foreign Application Priority Data
Nov. 15, 2013    (JP) .................................. 2013-237241

(51) Int. Cl.
G06F 11/30    (2006.01)
G06F 11/07    (2006.01)
G06F 11/34    (2006.01)

(52) U.S. Cl.
CPC ...... *G06F 11/0751* (2013.01); *G06F 11/0706* (2013.01); *G06F 11/3476* (2013.01)

(58) Field of Classification Search
CPC ............. G06F 11/0706; G06F 11/0751; G06F 11/3476
See application file for complete search history.

(56) References Cited

U.S. PATENT DOCUMENTS

| | | | |
|---|---|---|---|
| 2006/0256714 A1* | 11/2006 | Takagi | H04L 69/40 370/224 |
| 2011/0047414 A1* | 2/2011 | Kudo | G06F 11/079 714/37 |
| 2013/0042147 A1* | 2/2013 | Tonouchi | G06F 11/0781 714/37 |

FOREIGN PATENT DOCUMENTS

| | | |
|---|---|---|
| JP | 11-103302 | 4/1999 |
| JP | 2001-292143 | 10/2001 |
| JP | 2006-318071 | 11/2006 |

\* cited by examiner

*Primary Examiner* — Mohamed Charioui
*Assistant Examiner* — Eyob Hagos
(74) *Attorney, Agent, or Firm* — Staas & Halsey LLP

(57) ABSTRACT

A determination method includes obtaining, from a computer, history information of change time points indicating times at which processing for making a change to a program is executed; determining a predetermined time interval indicating an interval of the change time points; determining a first time period later than a latest change time point extracted from the history information, and a second time period earlier than the first time period; obtaining, from the computer, log messages including history of operations and operation time points corresponding to the operations; extracting, from the log messages, a first appearance pattern indicating a pattern of operations that appeared in the first time period and a second appearance pattern indicating a pattern of operations that appeared in the second time period; and determining whether a failure occurred in the first time period, based on a difference between the first appearance pattern and the second appearance pattern.

15 Claims, 15 Drawing Sheets

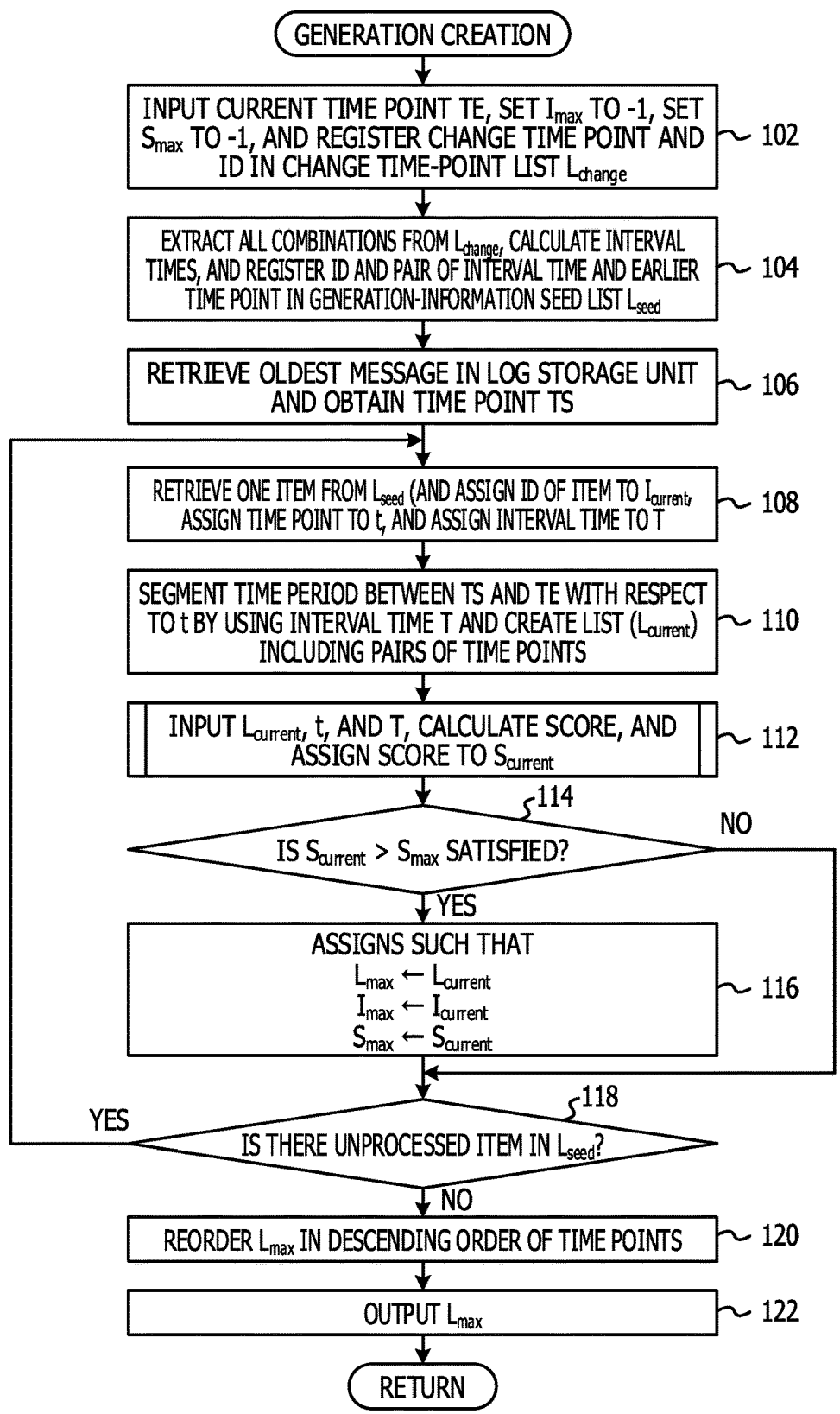

FIG. 7A
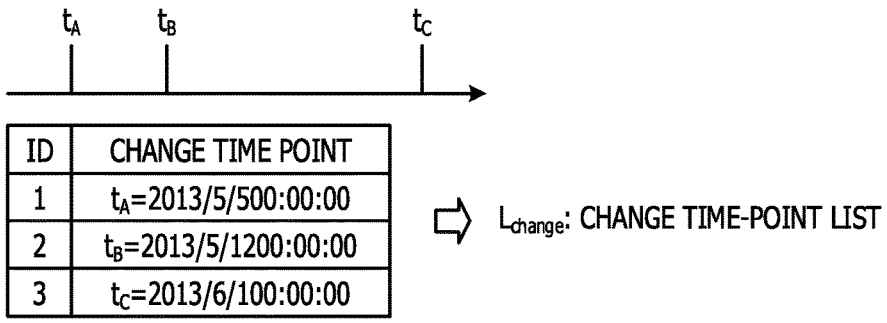
| ID | CHANGE TIME POINT |
|----|-------------------|
| 1 | $t_A$=2013/5/5 00:00:00 |
| 2 | $t_B$=2013/5/12 00:00:00 |
| 3 | $t_C$=2013/6/1 00:00:00 |
⇨ $L_{change}$: CHANGE TIME-POINT LIST
FIG. 7B
| ID | REFERENCE TIME POINT | INTERVAL TIME |
|----|----------------------|---------------|
| 1 | $t_A$ | $T_1=t_C-t_A=648:00:00$ |
| 2 | $t_A$ | $T_2=t_B-t_A=168:00:00$ |
| 3 | $t_B$ | $T_3=t_C-t_B=480:00:00$ |
⇨ $L_{seed}$: GENERATION-INFORMATION SEED LIST
FIG. 7C
RETRIEVE ONE ITEM [1:$t_A$:$T_1 = t_C-t_A$]  ⇨  $L_{seed}$: $\begin{pmatrix} 2: t_A \ T_2 \\ 3: t_B \ T_3 \end{pmatrix}$
$I_{current} \leftarrow 1$
$t \leftarrow t_A$
$T \leftarrow T_1$
FIG. 7D
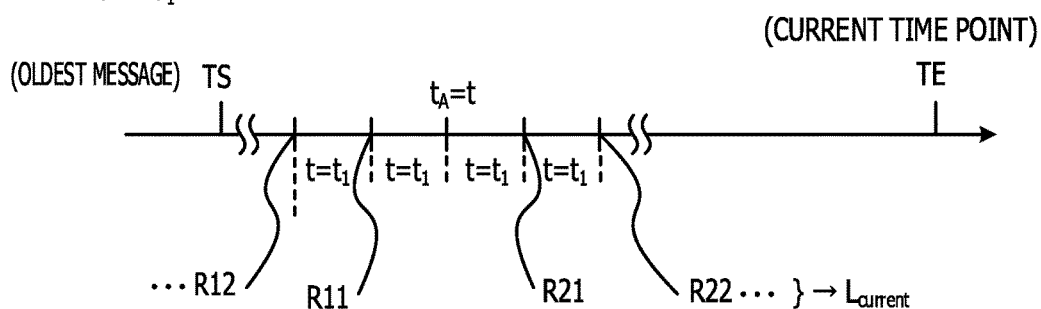

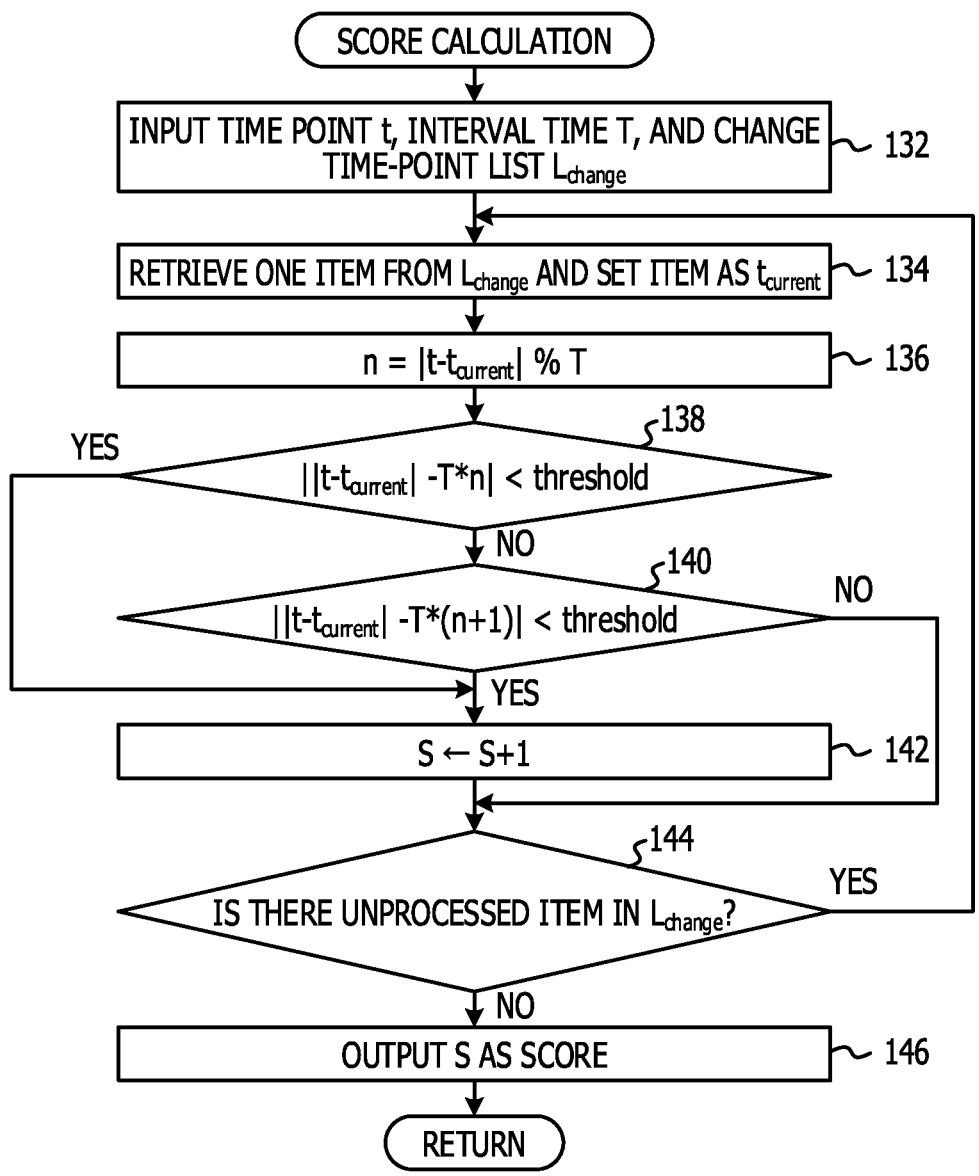

FIG. 9A
$L_{change} : t_C, t_B, t_A$
FIG. 9B
EXTRACT ONE ITEM $t_C$  ($\rightarrow L_{change} : t_B, t_A$)
$t_{current} \leftarrow t_C$
FIG. 9C
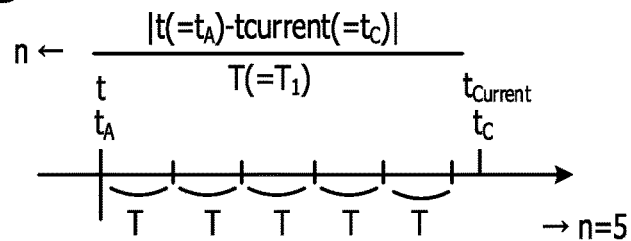
FIG. 9D
$||t-t_{current}|-T \times n|=P, ||t-t_{current}|-T \times (n+1)|=Q$
FIG. 9E
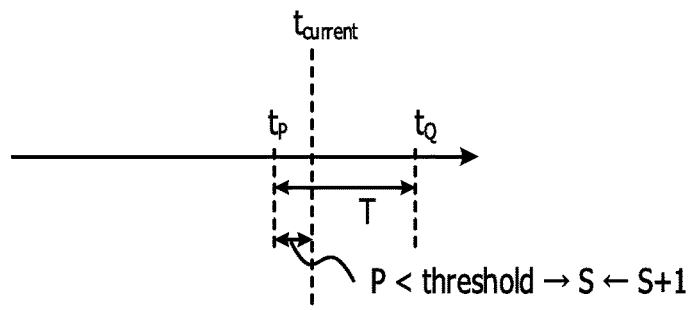
FIG. 9F
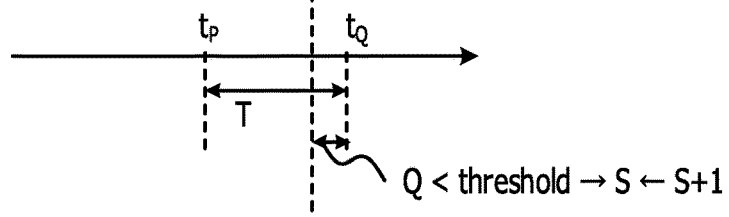
FIG. 9G
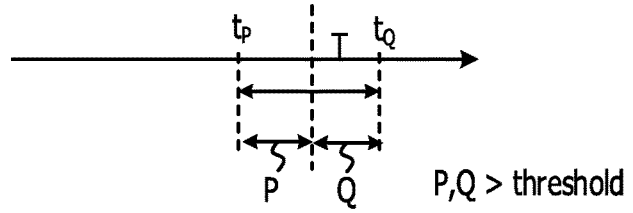

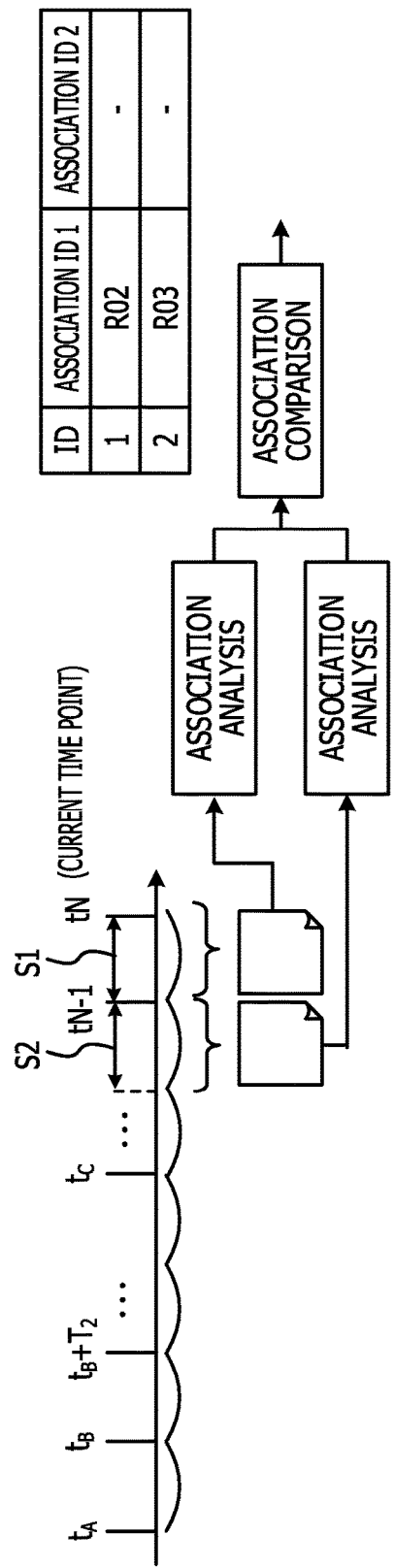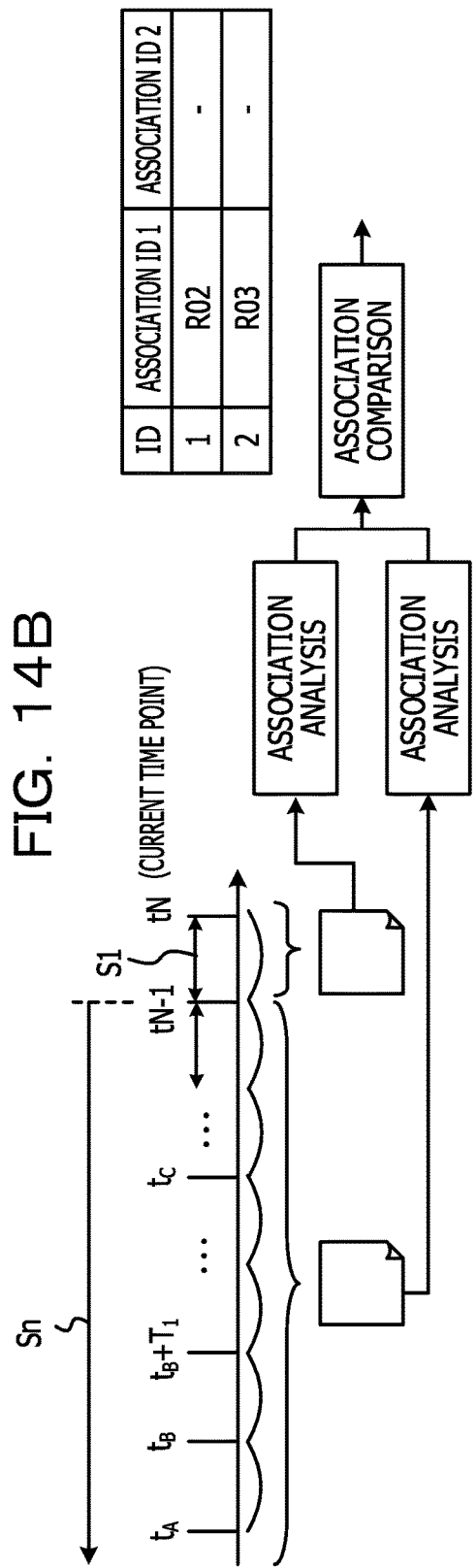

FIG. 15A

| ID | TYPE | TIME POINT | BODY |
|---|---|---|---|
| 1 | TYPE01 | 2013/4/1 00:00:00 | SYSTEM STARTUP |
| 2 | TYPE02 | 2013/4/1 00:01:00 | DISK RECOGNITION |
| 3 | TYPE03 | 2013/4/1 00:01:00 | NIC RECOGNITION |
| 4 | TYPE01 | 2013/5/8 09:00:00 | SYSTEM STARTUP |
| 5 | TYPE02 | 2013/5/8 09:01:00 | DISK RECOGNITION |
| 6 | TYPE03 | 2013/5/8 09:01:00 | NIC RECOGNITION |
| 7 | TYPE04 | 2013/5/8 09:04:00 | WEB SERVER STARTUP |
| 8 | TYPE01 | 2013/5/11 09:02:00 | SYSTEM STARTUP |
| 9 | TYPE02 | 2013/5/11 09:03:00 | DISK RECOGNITION |
| 10 | TYPE03 | 2013/5/11 09:03:00 | NIC RECOGNITION |
| 11 | TYPE04 | 2013/5/11 09:04:00 | WEB SERVER STARTUP |
| 12 | TYPE01 | 2013/5/25 09:00:00 | SYSTEM STARTUP |
| 13 | TYPE02 | 2013/5/25 09:01:00 | DISK RECOGNITION |
| 14 | TYPE03 | 2013/5/25 09:01:00 | NIC RECOGNITION |
| 15 | TYPE04 | 2013/5/25 09:03:00 | WEB SERVER STARTUP |
| 16 | TYPE01 | 2013/6/3 09:00:00 | SYSTEM STARTUP |
| 17 | TYPE02 | 2013/6/3 09:01:00 | DISK RECOGNITION |
| 18 | TYPE01 | 2013/6/5 09:00:00 | NIC RECOGNITION |
| 19 | TYPE02 | 2013/6/5 09:01:00 | WEB SERVER STARTUP |

FIG. 15B

| ID | TYPE 1 | TYPE 2 | AVERAGE | STANDARD DEVIATION |
|---|---|---|---|---|
| R01 | TYPE01 | TYPE02 | 1 | 0 | ← P1
| R02 | TYPE02 | TYPE03 | 0 | 0 | ← P2
| R03 | TYPE03 | TYPE04 | 1.5 | 0.7 | ← P3

FIG. 15C

| ID | TYPE 1 | TYPE 2 | AVERAGE | STANDARD DEVIATION |
|---|---|---|---|---|
| R01 | TYPE01 | TYPE02 | 1 | 0 | ← P1
| R02 | TYPE03 | TYPE04 | 10 | 15 | ← P4

FIG. 15D

| ID | ASSOCIATION ID 1 | ASSOCIATION ID 2 |
|---|---|---|
| R01 | R02 | - | ← EXAMPLE IN WHICH PRESENCE/ABSENCE OF LOG MESSAGES IS DIFFERENT
| R02 | R03 | R03 | ← EXAMPLE IN WHICH STATISTICAL VALUES ARE DIFFERENT

DETERMINATION METHOD, DETERMINATION APPARATUS, AND RECORDING MEDIUM

CROSS-REFERENCE TO RELATED APPLICATION

This application is based upon and claims the benefit of priority of the prior Japanese Patent Application No. 2013-237241, filed on Nov. 15, 2013, the entire contents of which are incorporated herein by reference.

FIELD

The embodiment discussed herein is related to a determination method, a determination apparatus, and a recording medium.

BACKGROUND

Heretofore, a technology has been available in which a monitoring apparatus (log-monitoring software) monitors a log of a processing system to be monitored and provides a service that notifies, upon occurrence of a certain level of anomaly (failure), the processing system of the anomaly. Details will now be described.

The processing system to be monitored includes a plurality of processing apparatuses. When operations occur in the processing apparatuses, the corresponding processing apparatuses associate operation data (messages) indicating the operations and data (time-point data) about the time points at which the operations occurred and transmit the associated data to the monitoring apparatus. Data including messages and time-point data are called log messages, such as those defined by syslog. The monitoring apparatus monitors the processing system, and determines (monitors) whether or not an anomaly is occurring in the processing apparatuses in the processing system, based on the log messages. Anomalies include low-level anomalies that are not severe enough to be reported to the processing system and high-level anomalies that are to be reported to the processing system because the levels of the anomalies are severe. Such high-level anomalies are called "failures". When a failure occurs in any of the processing apparatuses in the processing system, the monitoring apparatus reports the occurrence of the failure.

Anomaly detection has been available as a method for detecting occurrence of anomalies. That is, the monitoring apparatus detects an anomaly, for example, by finding an abrupt change in certain performance data. Related art is disclosed in, for example, Japanese Laid-open Patent Publication No. 11-103302, Japanese Laid-open Patent Publication No. 2001-292143, and Japanese Laid-open Patent Publication No. 2006-318071.

Anomalies in the system include not only anomalies that appear in changes in one type of operation but also anomalies that appear in a relationship between multiple types of operation. In anomaly detection, since changes in one type of operation are extracted, it is difficult to detect an anomaly that appears in a relationship between different types of operation.

SUMMARY

According to an aspect of the invention, a determination method executed by a processor included in a determination apparatus that determines whether there is a failure in a computer, the method includes obtaining, from the computer, history information of change time points, each of the change time points indicating a time at which a processing for making a change to a program executed by the computer is executed; determining a predetermined time interval indicating an interval of the change time points, based on the history information; determining a first time period later than a latest change time point extracted from the history information, and a second time period earlier than the first time period, based on the predetermined time interval and the latest change time point; obtaining, from the computer, log messages including history of operations performed at the computer and operation time points corresponding to the operations; extracting, from the log messages, a first appearance pattern indicating a pattern of operations that appeared in the first time period and a second appearance pattern indicating a pattern of operations that appeared in the second time period; and determining whether a failure occurred in the first time period, based on a difference between the first appearance pattern and the second appearance pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a flowchart illustrating an example of generation creation processing that a generation creation unit executes to create generations in step 82 in FIG. 5;

FIG. 7A illustrates an example of a process in step 102, FIG. 7B illustrates an example of a process in step 104, FIG. 7C illustrates an example of a process in step 108, and FIG. 7D illustrates an example of a process in step 110;

FIG. 8 is a flowchart illustrating an example of score calculation processing in step 112;

FIG. 9A illustrates an example of a process in step 132, FIG. 9B illustrates an example of a process in step 134, FIG. 9C illustrates an example of a process in step 136, FIG. 9D illustrates calculation expressions in step 138 and 140, FIG. 9E illustrates a case in which a determination result in step 138 indicates an affirmative determination, FIG. 9F illustrates a case in which a determination result in step 140 indicates an affirmative determination, and FIG. 9G illustrates a case in which a determination result in step 138 or 140 indicates an affirmative determination;

FIG. 14A illustrates a generation of a log to be compared in a first modification, and FIG. 14B illustrates a generation of a log to be compared in the first modification;

FIG. 15A illustrates an example of log messages in a third modification, FIG. 15B illustrates an example of an appearance pattern extracted from log messages in a current log L1, FIG. 15C illustrates an example of an appearance pattern extracted from log messages in a past log L2, and FIG. 15D illustrates anomaly information stored in a secondary storage device.

DESCRIPTION OF EMBODIMENT

Embodiments of the disclosed technology will be described below with reference to the accompanying drawings.

[Embodiment]

Figure 1:
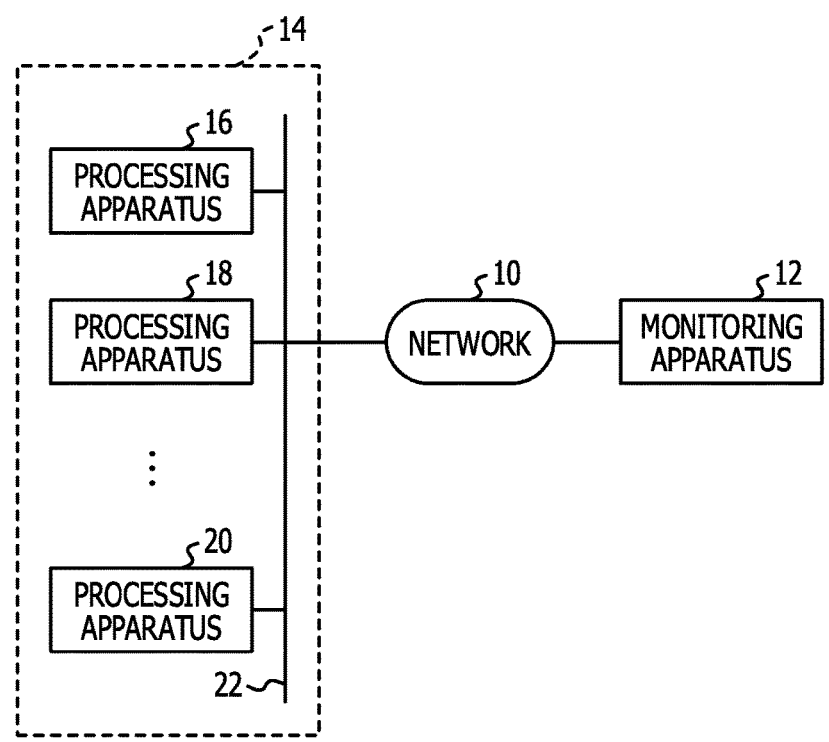
FIG. 1 is a block diagram of a monitoring system.

FIG. 1 is a block diagram of a monitoring system. As illustrated in FIG. 1, the monitoring system includes a monitoring apparatus 12 and a processing system 14 having a plurality of processing apparatuses 16, 18, . . . , and 20. The monitoring apparatus 12 and the processing system 14 are connected to each other through a network 10, such as the Internet.

The monitoring apparatus 12 is an example of a determination apparatus according to the disclosed technology.

When operations occur in the processing apparatuses 16, 18, . . . , and 20, the corresponding processing apparatuses 16, 18, . . . , and 20 associate operation data (messages) indicating the operations and data about time points (time-point data) at which the operations occurred and transmit the associated data to the monitoring apparatus 12. Data including messages and time-point data are called log messages, such as those defined by syslog. The monitoring apparatus 12 has a communication control unit 48 (described below in detail and illustrated in FIG. 2), which receives log messages transmitted from the processing apparatuses 16, 18, . . . , and 20.

Each of the processing apparatuses 16, 18, . . . , and 20 is an example of a target apparatus according to the technology disclosed herein. Each of the log messages is an example of state data according to the technology disclosed herein.

Examples of the aforementioned operations include startup of the processing system 14, recognition of a disk, recognition of a network interface card (NIC), and startup of a web server.

The aforementioned operations include anomalies that are different from an intended normal state. The anomalies include a first anomaly originating from hardware, such as a fault in a hard disk or the like. The anomalies include a second anomaly originating from software. Examples of the second anomaly include a human-caused setting error, such as erroneous setting of an IP address, and inclusion of an error (a bug) in an original program. The anomalies further include a third anomaly, which is a combination of the first anomaly and the second anomaly. The third anomaly is, for example, an event in which, when a fault (the first anomaly) occurs in a storage device in which data is stored, and the data is to be stored in a backup storage device, an error (the second anomaly) occurs in settings for storing data in the backup storage device.

The monitoring apparatus 12 monitors the processing system 14. More specifically, based on the log messages, the monitoring apparatus 12 determines (monitors) whether or not an anomaly is occurring in the processing apparatuses 16, 18, . . . , and 20 in the processing system 14 and what type of anomaly is occurring.

Some of the anomalies are low-level anomalies that are not severe enough to be reported to the processing system 14 and some are high-level anomalies that are to be reported to the processing system 14 because the levels of the anomalies are severe. Such high-level anomalies are called "failures". When a failure occurs in the processing apparatuses 16, 18, . . . , and 20 in the processing system 14, the monitoring apparatus 12 notifies the processing system 14 that a failure has occurred. The monitoring apparatus 12 plays the role of so-called log-monitoring software.

Log analysis comparison processing is processing for detecting an anomaly that appears in a relationship between different operations, specifically, in a difference in an appearance pattern of the log messages. Upon detecting that an anomaly that appears in a difference in the appearance pattern has occurred, the monitoring apparatus 12 notifies, during failure-occurrence notification, the processing system 14 that an anomaly that appears in a difference in the appearance pattern has occurred.

When an anomaly that appears in a difference in the appearance pattern is detected, a notification of the occurrence of the anomaly may or may not be issued to the processing system 14 independently from the failure occurrence notification. For example, the monitoring apparatus 12 may detect, on a regular basis (for example, every day), an anomaly that appears in a difference in the appearance pattern and may notify, on a regular basis, the processing system 14 about the result of the detection. In addition, the monitoring apparatus 12 may detect, on an irregular basis, an anomaly that appears in a difference in the appearance pattern and may notify, on a regular basis, the processing system 14 about the result of the detection.

The processing for detecting an anomaly that appears in a difference in the appearance pattern may also be performed upon receiving a request from the processing system 14, rather than being executed on a periodic basis.

The monitoring apparatus 12 and each of the processing apparatuses 16, 18, . . . , and 20 have the same or similar configurations. Accordingly, the configuration of the monitoring apparatus 12 will be described below.

Figure 2:
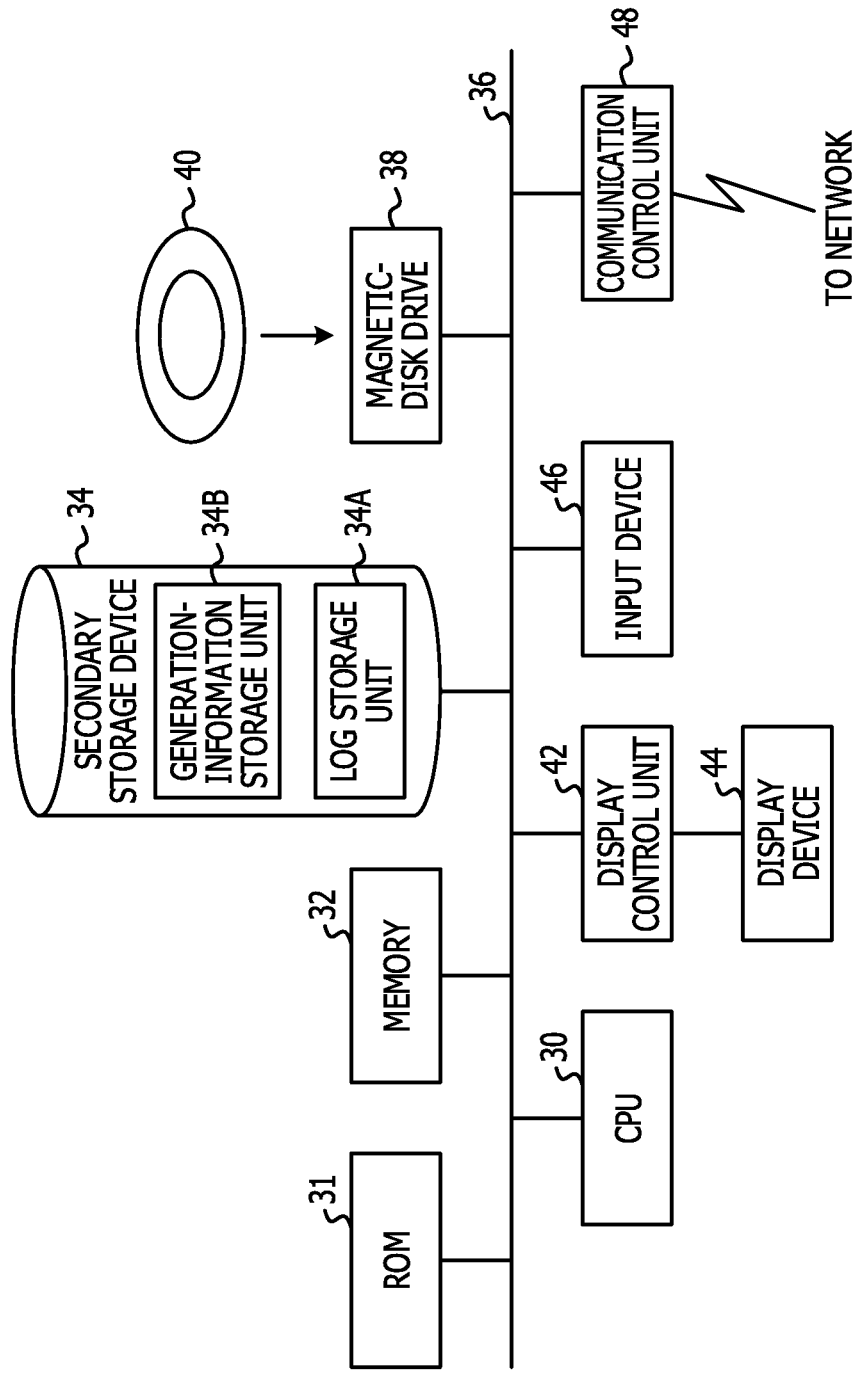
FIG. 2 is a block diagram of a monitoring apparatus.

FIG. 2 is a block diagram of the monitoring apparatus 12. As illustrated in FIG. 2, in the monitoring apparatus 12, a central processing unit (CPU) 30, a read-only memory (ROM) 31, and a memory 32 are coupled to one another through a bus 36. A secondary storage device 34, a magnetic-disk drive 38, an input device 46, and the aforementioned communication control unit 48 are further coupled to the bus 36, and a display device 44 is coupled to the bus 36 via a display control unit 42. Examples of the display device 44 include a liquid-crystal display (LCD) device, a cathode-ray tube (CRT) display, an organic electroluminescent display (OELD) device, a plasma display panel (PDP), and a field emission display (FED). Examples of the input device 46 include a keyboard and a mouse. The secondary storage device 34 includes a log storage unit 34A for storing log messages and a generation-information storage unit 34B for storing generation information.

The configuration of each of the processing apparatuses 16, 18, . . . , and 20 in the processing system 14 may be modified periodically. For example, an operating system (OS) may be modified. In addition, a task program stored in each of the processing apparatuses 16, 18, . . . , and 20 may be modified. The modifications are made by applying a difference between an old program and a new program to the old program. That is, the modifications are made by applying so-called patches. The processing system 14 transmits, to the monitoring apparatus 12, data about a plurality of change time points (refer to time points $t_A$, $t_B$, and $t_C$ described below and illustrated in FIG. 7A) at which configuration changes to the processing system 14 were completed. The monitoring apparatus 12 receives the data about the change time points and stores the data in the secondary storage device 34. An operator may input the plurality of change time points via the input device 46.

The secondary storage device 34 is an example of a storage unit according to the technology disclosed herein.

Figure 3:
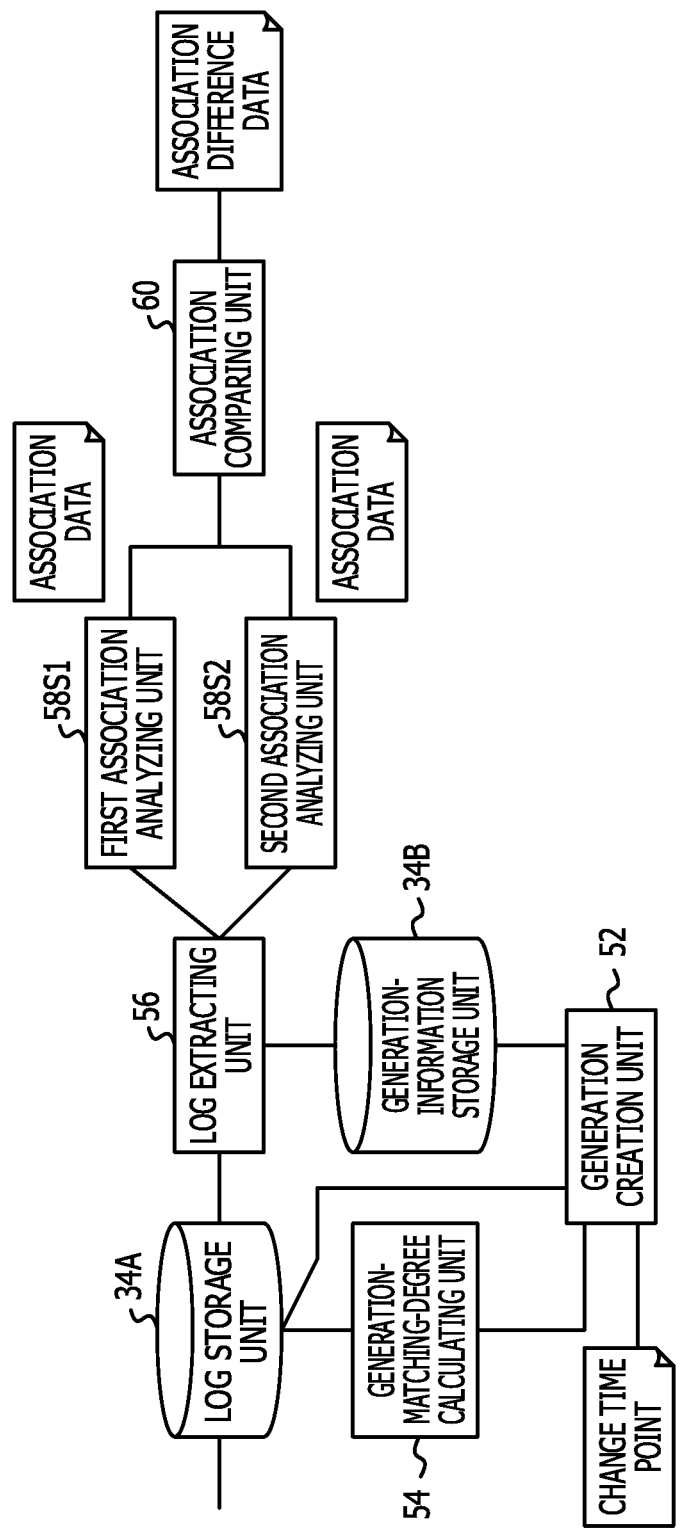
FIG. 3 is a diagram illustrating functional units realized by a log analysis comparison program stored in a ROM in the monitoring apparatus.

FIG. 3 is a diagram illustrating functional units realized by a log analysis comparison program stored in the ROM 31 in the monitoring apparatus 12. The functional units of the log analysis comparison program include a generation-matching-degree calculating unit 54, which calculates matching degrees of a plurality of generations described below. The functional units of the log analysis comparison program include a generation creation unit 52, which creates generation information, based on the above-described log messages, the data about the change time points, and the matching degree between the generations. The functional units of the log analysis comparison program include a log extracting unit 56, which extracts the log messages of a current generation and the log messages of a past generation from the log storage unit 34A, based on the generation information created by the generation creation unit 52. The functional units of the log analysis comparison program include a first association analyzing unit 58S1, which performs association analysis on the log messages of the current generation so as to detect an appearance pattern of associated log messages, based on the extracted log messages of the current generation. The functional units of the log analysis comparison program further include a second association analyzing unit 58S2, which performs association analysis on the log messages of the past generation so as to detect an appearance pattern of associated log messages, based on the extracted log messages of the past generation. Results of the analyses of the first association analyzing unit 58S1 and the second association analyzing unit 58S2 are input to an association comparing unit 60 as association data. The association data indicates an appearance pattern of log messages described below. The functional units of the log analysis comparison program include the association comparing unit 60, which obtains a difference between an appearance pattern detected from the log messages of the current generation and an appearance pattern detected from the log messages of the past generation and outputs (stores) the difference to (in) the secondary storage device 34 as association difference data.

Although a case in which the log analysis comparison program is read from the ROM 31 has been described above as an example, it may or may not be initially stored in the ROM 31. For example, the log analysis comparison program may also be initially stored in an arbitrary portable storage medium, such as a solid-state drive (SSD), a digital versatile disc (DVD), an integrated circuit (IC) card, a magneto-optical disk, or a compact disc read-only memory (CD-ROM), which is used through connection to the monitoring apparatus 12. The monitoring apparatus 12 may be adapted to obtain a screen-data transfer program from the portable storage medium and to execute the screen-data transfer program. The screen-data transfer program may also be stored in a storage unit in another computer, a server apparatus, or the like connected to the monitoring apparatus 12 through a communication channel. In such a case, the monitoring apparatus 12 obtains the log analysis comparison program from the other computer, server apparatus, or the like and executes the log analysis comparison program.

The log analysis comparison program is an example of a determination program according to the technology disclosed herein. The ROM 31 is an example of a storage medium according to the technology disclosed herein.

Figure 4:
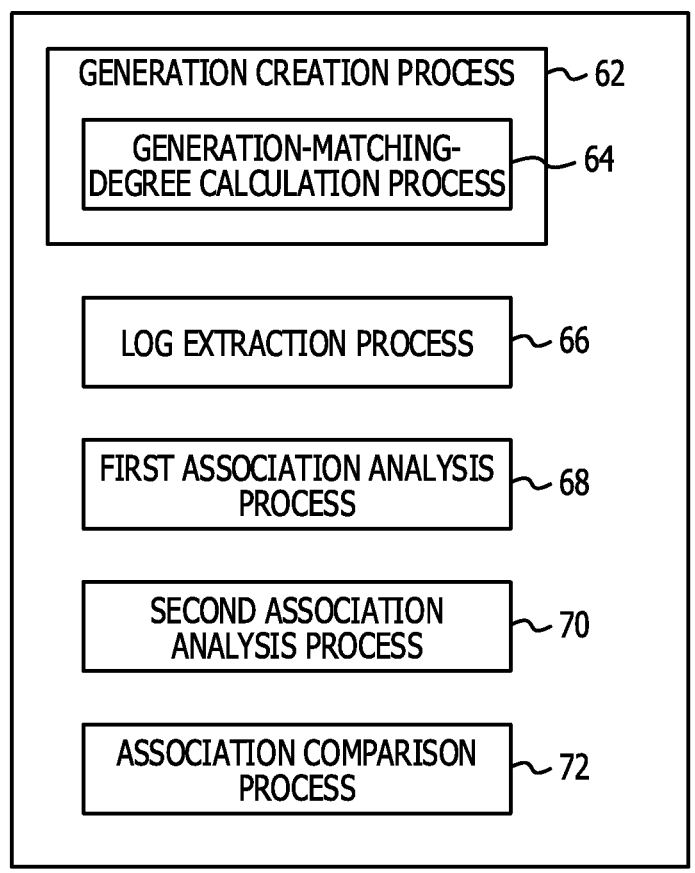
FIG. 4 is a diagram illustrating processes of the log analysis comparison program.

FIG. 4 is a diagram illustrating processes of the log analysis comparison program. As illustrated in FIG. 4, the processes of the log analysis comparison program include a generation creation process 62, a log extraction process 66, a first association analysis process 68, a second association analysis process 70, and an association comparison process 72. The generation creation process 62 includes a generation-matching-degree calculation process 64.

The CPU 30 executes the processes 62 to 72 to thereby operate as the units 52 to 60 described above and illustrated in FIG. 3.

Operations in the present embodiment will be described next.

Figure 5:
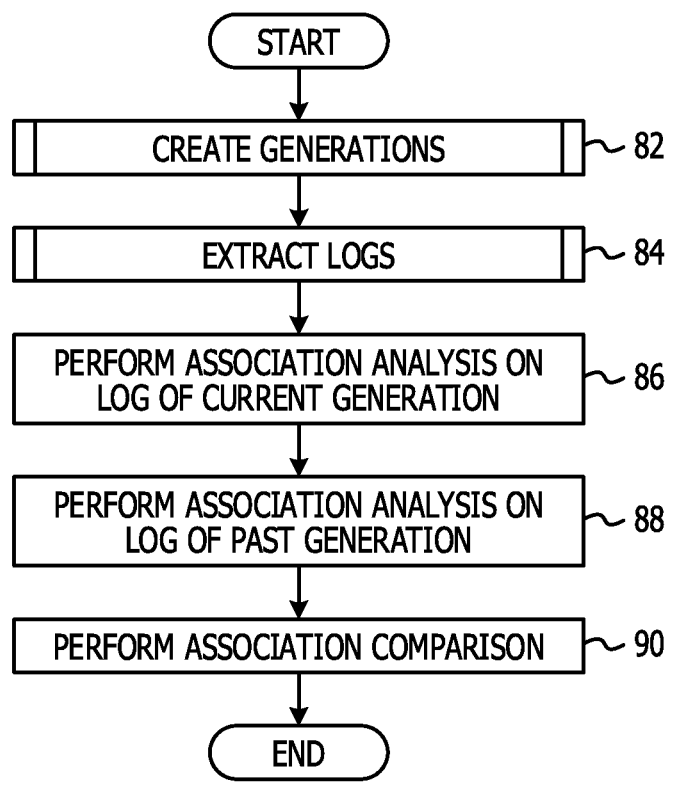
FIG. 5 is a flowchart illustrating an example of log analysis comparison processing.

FIG. 5 is a flowchart illustrating an example of the log analysis comparison processing. The log analysis comparison processing is processing for detecting an anomaly that appears in a relationship between different operations, specifically, an anomaly that appears in a difference in the appearance pattern. As illustrated in FIG. 5, in step 82, the generation creation unit 52 creates generations. In step 84, the log extracting unit 56 extracts logs. In step 86, the first association analyzing unit 58S1 performs association analysis on the log of the current generation. In step 88, the second association analyzing unit 58S2 performs association analysis on the log of the past generation. In step 90, the association comparing unit 60 performs association comparison. The processes in steps 82 to 90 will be described below in detail.

FIG. 6 is a flowchart illustrating an example of generation creation processing that the generation creation unit 52 executes to create the generations in step 82 in FIG. 5.

The term "generations" refers to time segments determined by intervals (a regular interval time) of the time points of configuration changes that occur periodically in the processing system 14 (which may hereafter be referred to as a "system").

The reason why the generations are determined is to determine the newest generation, that is, the time period after the latest change time point at which a configuration change was made to the system. The reason will now be described in more detail. The latest change time point is a change time point that is the closest to the current time point among time points at which configuration changes were periodically made to the processing apparatuses 16, 18, . . . , and 20.

When an elapsed time from a given change time point to the current time point is segmented by using a regular interval time that is defined by time intervals of the time points of configuration changes that periodically occur in the system, it is possible to determine the latest time point at which a configuration change was made to system. After a configuration change is made to the system, the possibility that an anomaly occurs increases. This is because, for example, the setting for operation of the system may go wrong upon the configuration change or a bug may be included in a patch for the configuration change. The monitoring apparatus 12 determines what type of anomaly is currently occurring in the processing apparatuses 16, 18, . . . , and 20 included in the system. Thus, in order to detect an anomaly in the latest generation, the monitoring apparatus 12 determines the newest generation, that is, the time period after the latest time point at which a configuration change was made to the system.

In step 102, the generation creation unit 52 included in the monitoring apparatus 12 inputs the current time point TE, sets a variable $I_{max}$ to −1, and sets a variable $S_{max}$ to −1. The generation creation unit 52 registers, in a change time-point list $L_{change}$, the change time point and an identifier (ID) for the change time point. FIG. 7A illustrates an example of the change time-point list $L_{change}$. As illustrated in FIG. 7A, three change time points, namely, time points $t_A$, $t_B$, and $t_C$ are given. Of the time points $t_A$, $t_B$, and $t_C$, the time point $t_A$ is the oldest, and the time point $t_C$ is the newest. That is, the time point $t_C$ is the closest to the current time point. The given change time points $t_A$, $t_B$, and $t_C$ do not represent all change time points. Thus, the interval time between the time point $t_A$ and the time point $t_B$ and the interval time between the time point $t_B$ and the time point $t_C$ are different from each other. Which of the interval times is correct as the regular interval time is not known at this point in time.

In step 104, the generation creation unit 52 extracts all combinations of given change time points from the change time points registered in the change time-point list $L_{change}$. With respect to all the extracted combinations, the generation creation unit 52 calculates interval times indicating differences between the change time points. For example, using the change time points $t_A$, $t_B$, and $t_C$ illustrated in FIG. 7A, the generation creation unit 52 calculates interval times $T_1$ ($=t_C-t_A$), $T_2$ ($=t_C-t_A$), and $T_3$ ($=t_C-t_B$) illustrated in FIG. 7B. Subsequently, the generation creation unit 52 registers, in a generation-information seed list $L_{seed}$, each of the interval times (three interval times $T_1$, $T_2$, and $T_3$ in the above example), an earlier time point (a reference time point) of two time points that define the corresponding interval time, and the corresponding ID in association with each other.

In step 106, the generation creation unit 52 retrieves an oldest message in the log storage unit 34A and obtains a time point TS at which an operation corresponding to the oldest message was performed. In step 108, the generation creation unit 52 retrieves one item from the generation-information seed list $L_{seed}$. As a result, in the example in FIG. 7B, two items remain in the generation-information seed list $L_{seed}$.

After step 108, the generation creation unit 52 assigns the ID of the retrieved item to $I_{current}$, assigns the reference time point to t, and assigns the interval time to T. For example, as illustrated in FIG. 7C, the generation creation unit 52 retrieves ID=1, reference time point $=t_A$, and interval time $T_1=t_C-t_A$ of one item from the generation-information seed list $L_{seed}$. The generation creation unit 52 assigns 1 to $I_{current}$, assigns $t_A$ to the reference time point t, and assigns $T_1$ ($=t_C-t_A$) to the interval time T.

In step 110, the generation creation unit 52 segments a time period between the time point TS at which the oldest message was obtained and the current time point TE into earlier and later time periods with respect to t, that is, a time period earlier than t and a time period later than t, by using the interval time T, as illustrated in FIG. 7D. As a result, pairs composed of time boundaries earlier than t and time boundaries later than t are obtained. That is, for example, R11 and R21 are obtained as time points at the first time boundaries with respect to t, and R12 and R22 are obtained as time points at the second time boundaries with respect to t. The generation creation unit 52 assigns the pairs of time points at the time boundaries to $L_{current}$.

In step 112, the generation-matching-degree calculating unit 54 calculates, with respect to inputs of $L_{current}$, t, and T, a score indicating the degree of certainty that the interval time T is the regular interval time of the system configuration change time points, as described below in detail with reference to FIG. 8 or 10. The generation-matching-degree calculating unit 54 assigns the calculated score to $S_{current}$.

In step 114, the generation creation unit 52 determines whether or not $S_{current}>S_{max}$ is satisfied. If it is determined that $S_{current}>S_{max}$ is not satisfied (negative in step 114), the generation creation processing skips step 116 and proceeds to step 118. If it is determined that $S_{current}>S_{max}$ is satisfied (affirmative in step 114), the generation creation processing proceeds to step 116. In step 116, the generation-matching-degree calculating unit 54 assigns $L_{current}$ to $L_{max}$, assigns $I_{current}$ to $I_{max}$, and assigns $S_{current}$ to $S_{max}$.

In step 118, the generation creation unit 52 determines whether or not there is an unprocessed item in the generation-information seed list $L_{seed}$. If it is determined that there is an unprocessed item in the generation-information seed list $L_{seed}$ (affirmative in step 118), the generation creation processing returns to step 108, and the above-described processes (steps 108 to 118) are executed on the unprocessed item. If the above-described processes (steps 108 to 118) are executed on every item in the generation-information seed list $L_{seed}$, the determination result in step 118 indicates a negative determination. If it is determined that there is no unprocessed item in the generation-information seed list $L_{seed}$ (negative in step 118), the generation creation processing proceeds to step 120. In this case, if the determination result in step 118 indicates a negative determination, the interval time T in $L_{current}$ assigned to $L_{max}$ is an interval time that is the most certain as the regular interval time. That is, the interval time T in $L_{current}$ assigned to $L_{max}$ is a minimum interval time. In step 120, the generation creation unit 52 reorders the pairs of time points (R11 and R21, R12 and R22, . . . ) at the time boundaries in $L_{max}$ in descending order of time points to obtain time points ( . . . , R12, R11, t, R21, R22, . . . ).

In step 122, the generation creation unit 52 outputs (stores) $L_{max}$ to (in) the generation-information storage unit 34B.

FIG. 8 is a flowchart illustrating an example of score calculation processing for calculating the score in step 112 in FIG. 6. In the score calculation processing illustrated in FIG. 8, the generation-matching-degree calculating unit 54 calculates, as a score S indicating the degree of certainty that the interval time T is the regular interval time of the system configuration change time points, a value indicating whether or not segmentation points (described below) based on the interval time T agree with given change time points ($t_A$, $t_B$, and $t_C$).

In step 132, the generation-matching-degree calculating unit 54 inputs the time point t, the interval time T, and the change time-point list $L_{change}$ (see FIGS. 7A and 9A).

In step 134, the generation-matching-degree calculating unit 54 retrieves one item from the change time-point list $L_{change}$ and sets the item as $t_{current}$. For example, as illustrated in FIG. 9B, the generation-matching-degree calculating unit 54 retrieves the time point $t_C$. As a result, two items (the time points $t_B$ and $t_A$) remain in the change time-point list $L_{change}$.

In step 136, the generation-matching-degree calculating unit 54 calculates $n=|t-t_{current}|\% T$. In the above-described example (FIGS. 7C and 9A), t is $t_A$, $t_{current}$ is $t_C$, and T is the interval time $T_1$. In the calculation for the above-noted equation, the number in the integer portion of a quotient obtained by dividing the interval time between the time point $t_C$ and the time point $t_A$ by the interval time $T_1$ is assigned to n. In the example illustrated in FIG. 9C, 5 is assigned to n.

In step 138, the generation-matching-degree calculating unit 54 determines whether or not $||t-t_{current}|-T*n|<$threshold is satisfied. If the determination result in step 138 indicates an affirmative determination, the score calculation processing skips step 140 and proceeds to step 142. On the other hand, if the determination result in step 138 indicates a negative determination, the score calculation processing proceeds to step 140. In step 140, the generation-matching-degree calculating unit 54 determines whether or not $||t-t_{current}|-T*(n+1)|<$threshold is satisfied. If the determination result in step 140 indicates an affirmative determination, the score calculation processing proceeds to step 142. If the determination result in step 140 indicates a negative determination, the score calculation processing proceeds to step 144.

In steps 138 and 140 described above, the generation-matching-degree calculating unit 54 determines whether or not a segmentation point based on the interval time T agrees with a given change time point. As illustrated in FIG. 9D, the value (time) of $||t-t_{current}|-T*n|$ in step 138 is represented by P, and the value (time) of $||t-t_{current}|-T*(n+1)|$ in step 140 is represented by Q. A time point tP that is earlier than the time point $t_{current}$ by the time P and a time point tQ that is later than the time point $t_{current}$ by the time Q are time points at segmentation points that segment a generation to which the time point $t_{current}$ belongs. When the segmentation point based on the interval time T agrees with a given change time point, one of P and Q is 0. That is, the interval time between the time points $t_A$ and $t_C$ in FIG. 9C is highly likely to be an integer multiple of the interval time T. However, the time point at which a system configuration change is actually completed may be slightly earlier or later than a periodical time point. Accordingly, in the present embodiment, such a slightly offset time is used as a threshold. Thus, when the segmentation point based on the interval time T agrees with the given change time point, it is determined that one of P and Q is smaller than the threshold. Accordingly, if the determination result in any of steps 138 and 140 indicates an affirmative determination, the generation-matching-degree calculating unit 54 adds 1 to the score S in step 142.

In step 144, the generation-matching-degree calculating unit 54 determines whether or not there is an unprocessed item in the change time-point list $L_{change}$. If it is determined that there is an unprocessed item in the change time-point list $L_{change}$ (affirmative in step 144), there is an item on which the above-described determination(s) in steps 138 and/or 140 has (have) not been made. Thus, the score calculation processing returns to step 134, and the above-described processes are executed (steps 134 to 144). On the other hand, if the above-described processes (steps 134 to 144) are executed on every item in the change time-point list $L_{change}$, it is determined in step 144 that there is no unprocessed item in the change time-point list $L_{change}$ (negative in step 144). In this case, the score calculation processing proceeds to step 146.

In step 146, the generation-matching-degree calculating unit 54 outputs S as the score.

Figure 10:
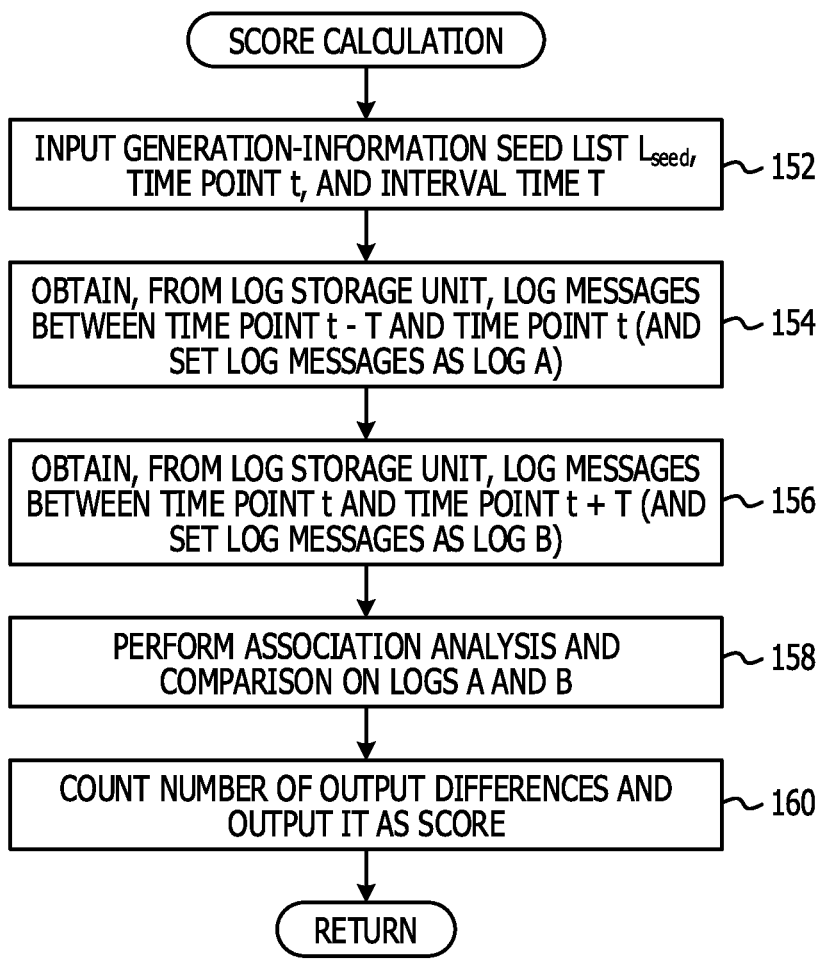
FIG. 10 is a flowchart illustrating another example of the score calculation processing in step 112.

FIG. 10 is a flowchart illustrating another example of the score calculation processing for calculating the score in step 112 in FIG. 6. That is, in the score calculation processing for calculating the score in step 112 in FIG. 6, either the score calculation processing in FIG. 8 or the score calculation processing in FIG. 10 is executed.

In the score calculation processing in FIG. 10, the number of anomalies that have occurred after a system configuration change is calculated as the score indicating the degree of certainty that the interval time T is the interval time of system configuration change time points. When the interval time T is correct as the regular interval time, there are cases in which an anomaly that appears in the relationship between operations of different types occurs after a system configuration change time point. That is, there are cases in which an appearance pattern of log messages in a time period between a time point that is earlier than the change time point by one interval time T and the change time point and an appearance pattern of log messages between the change time point and a time point that is later than the change time point by one interval time T may be different from each other.

On the other hand, when the interval time T is not correct as the regular interval time, the above-described two appearance patterns are not as prominently different from each other as those in the case in which the interval time T is correct as the regular interval time. When the interval time T is not correct as the regular interval time, in practice, at least one change time point exists between that change time point and a time point that is earlier and later than the change time point by one interval time T. That is, when the interval time T is not correct as the regular interval time, a time period between a time point that is earlier than that change time point by at least one interval time T and that change time point and a time period between that change time point and a time period that is later than that change time point by at least one interval time T can be each divided into a time period before another change time point that exists in the corresponding period and a time period after the other change time point. As described above, the appearance patterns after a change time point differ from each other. However, there are cases in which similar anomalies due to human-caused operations occur repeatedly each time a configuration change is made. When another change time point exists in a time period between the change time point and a time point that corresponds to the interval time T, similar anomalies occur repeatedly in the time period. This makes it difficult to identify the anomalies. In such a manner, when the interval time T is not correct as the regular interval time, the appearance pattern of log messages in a time period between a time point that is earlier than a change time point by one interval time T and the change time point and a time period between the change time point and a time period that is later than the change time point by one interval time T are not as prominently different from each other as those in the case in which the interval time T is correct as the regular interval time. Thus, the larger the number of difference appearance patterns in the period between a time period that is earlier than a change time point and the change time point and by one interval time T and the period between a time point later than the change time point by one interval time T is, the interval time T can be determined to be correct as the regular interval time.

Accordingly, in the score calculation processing illustrated in FIG. 10, the number of anomalies detected after a system configuration change is calculated as the score indicating the degree of certainty that the interval time T is the interval time of the system configuration change time points.

In step 152, the generation-matching-degree calculating unit 54 inputs the generation-information seed list $L_{seed}$, the time point t, and the interval time T. In step 154, as illustrated in FIG. 11, the generation-matching-degree calculating unit 54 obtains, from the log storage unit 34A, log messages between a time point that is earlier than the change time point t by one interval time T and the change time point t (that is, "time point t"–"interval time T") and sets the obtained log messages as a log A.

Figure 11:
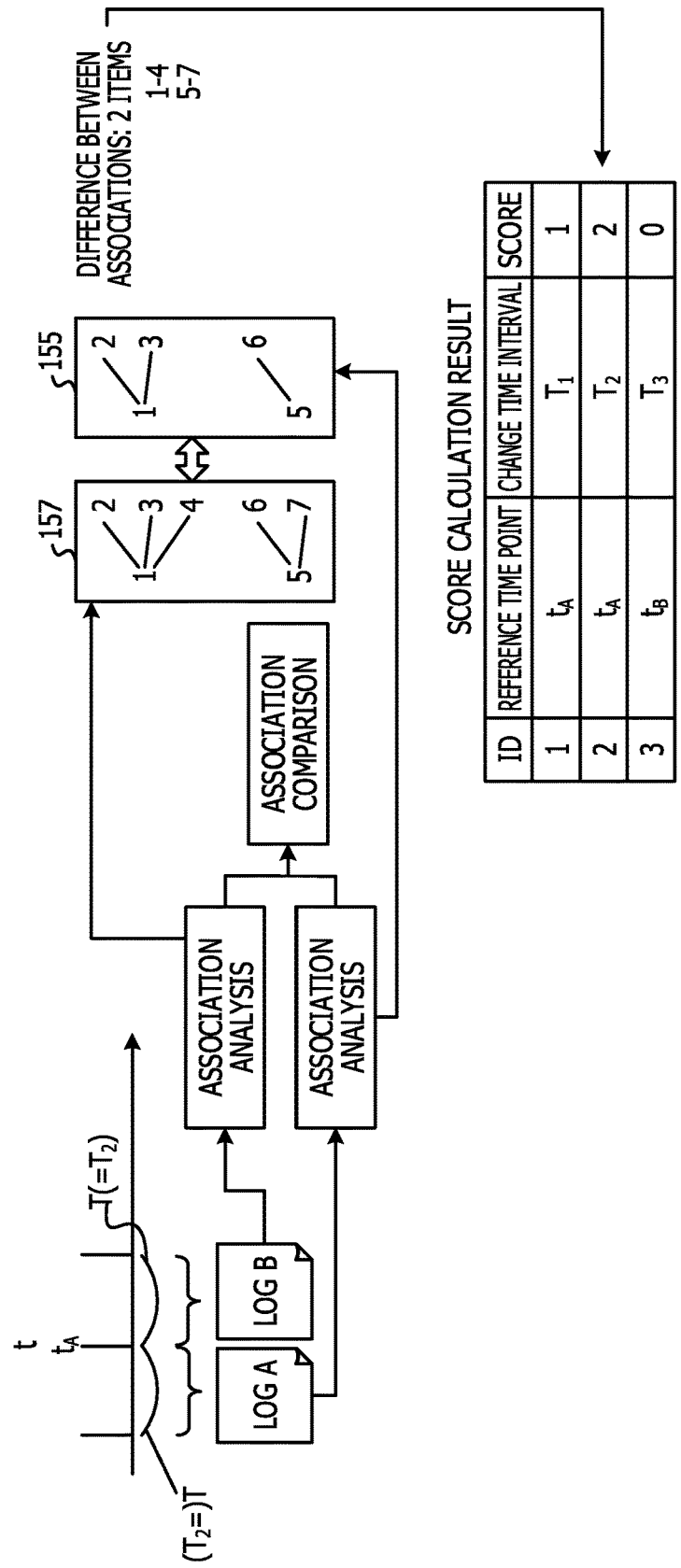
FIG. 11 illustrates specific processing of the score calculation processing in FIG. 10.

In step 156, as illustrated in FIG. 11, the generation-matching-degree calculating unit 54 obtains, from the log storage unit 34A, log messages between the change time point t and a time point that is later than the change time point t by one interval time T (that is, "time point t" to "time point t+T") and sets the obtained log messages as a log B.

In step 158, the generation-matching-degree calculating unit 54 performs association analysis and comparison on the logs A and B, as illustrated in FIG. 11. That is, first, in the association analysis on the log A, the generation-matching-degree calculating unit 54 extracts an appearance pattern of the log messages in the log A. In the association analysis on the log B, the generation-matching-degree calculating unit 54 extracts an appearance pattern of the log messages in the log B. In the comparison, a difference between both the appearance patterns in the logs A and B is determined.

In the example illustrated in FIG. 11, the appearance pattern of the log messages in the log A is determined to be a pattern 155 (association data) by the analysis. The appearance pattern of the log messages in the log B is determined to be a pattern 157 (association data) by the analysis. The generation-matching-degree calculating unit 54 obtains a difference between the patterns 155 and 157. The pattern 157 includes two new patterns that do not exist in the pattern 155, that is, a pattern in which a log message 4 appears after a log message 1 and a pattern in which a log message 7 appears after a log message 5. Thus, it is determined that, since an anomaly was triggered by the system configuration change, the two new patterns have occurred in the pattern 157 after the system change time point $t_A$.

In step 160, the generation-matching-degree calculating unit 54 counts the number of output differences. The generation-matching-degree calculating unit 54 then outputs the counted value as the score ("2" in the example described above and illustrated in FIG. 11).

Figure 12:
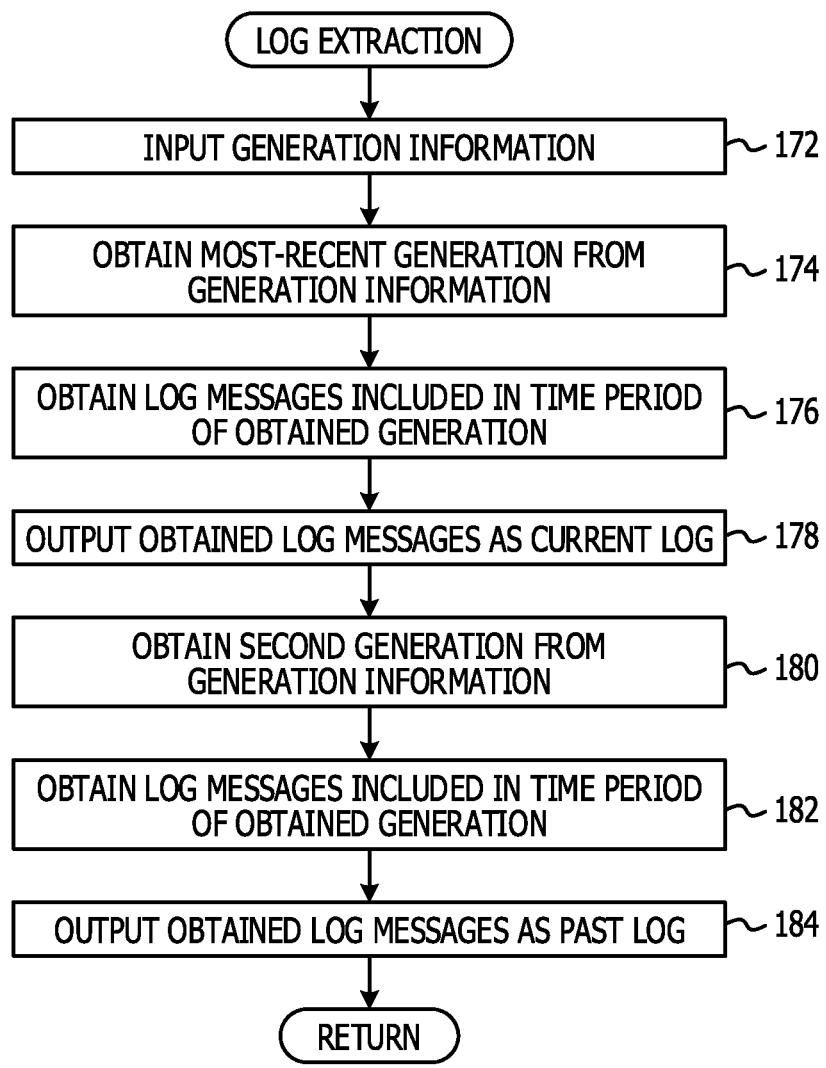
FIG. 12 is a flowchart illustrating an example of log extraction processing in step 84 in FIG. 5.

FIG. 12 is a flowchart illustrating an example of log extraction processing in step 84 in FIG. 5. As described above, in step 122 (in FIG. 6) in the generation creation processing in step 82 (in FIG. 5), generation information is stored in the generation-information storage unit 34B. The generation information indicates time points (. . . , R12, R11, t, R21, R22, . . . ) obtained by re-ordering, in descending order, time points (generation information) at the time boundaries obtained by segmenting an elapsed time from a given change time point t to the current time point by using the above-described interval time (the regular interval time) determined to be correct. Thus, in step 172, the log extracting unit 56 inputs the generation information.

Figure 13:
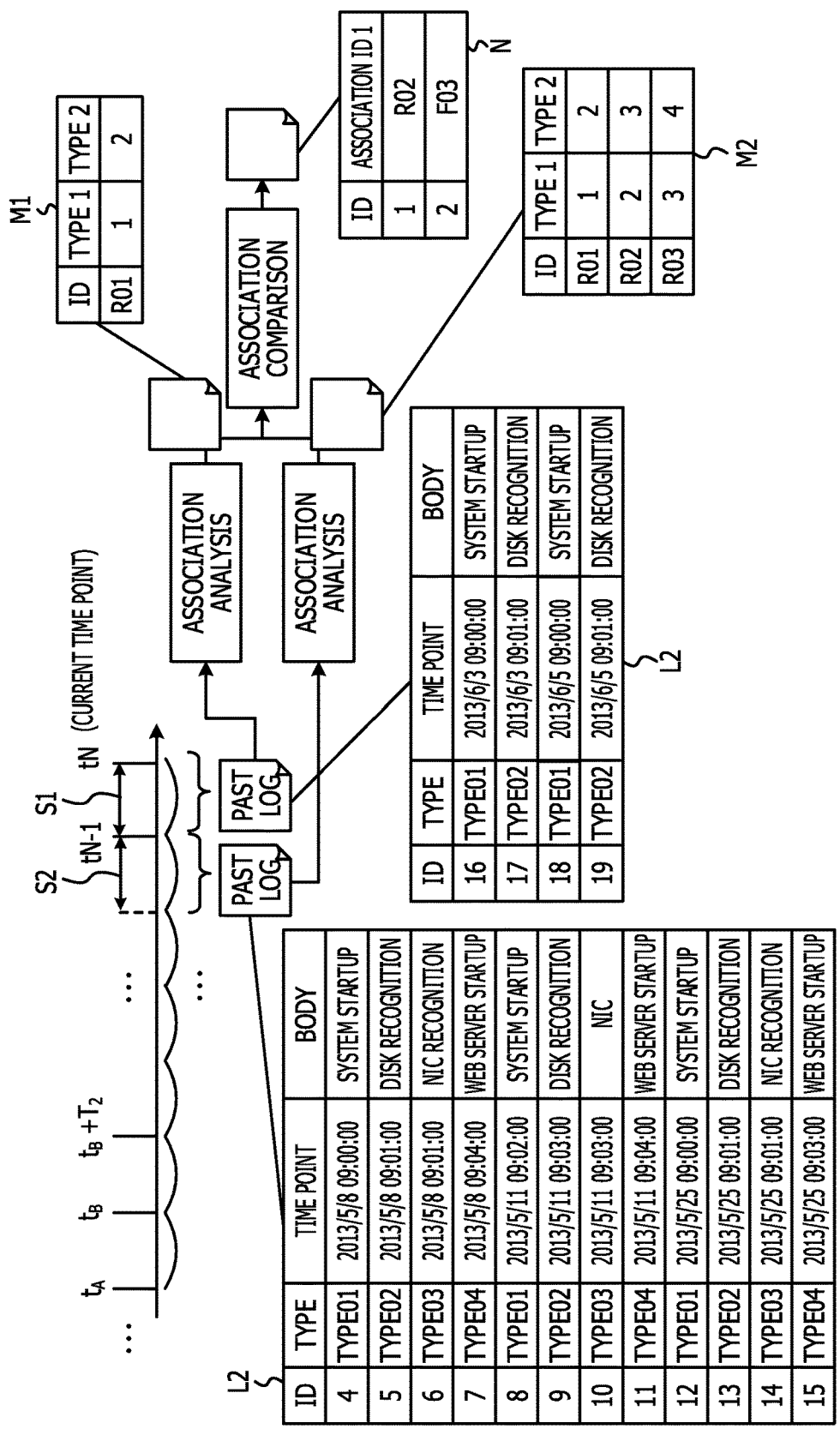
FIG. 13 illustrates specific processing of the log extraction processing in FIG. 12.

In step 174, the log extracting unit 56 obtains a most-recent generation S1 from the generation information. That is, for example, as illustrated in FIG. 13, the log extracting unit 56 obtains, from the generation information, a generation including a current time point tN, that is, a time period between a time point tN−1 at the time boundary that is the closest to the current time point tN and the current time point tN.

In step 176, the log extracting unit 56 obtains, from the log storage unit 34A, log messages included in the time period of the most-recent generation obtained in step 174. In step 178, the log extracting unit 56 outputs the log messages, obtained in step 176, as a current log L1. As illustrated in FIG. 13, each of the log messages in the current log L1 includes information of the ID of the corresponding log message, the type thereof, a time point (the time point at which an operation was performed), and specific content (body).

In step 180, the log extracting unit 56 obtains a second generation S2 from the generation information. That is, the log extracting unit 56 obtains a time period between a time point tN−2, located at the time boundary that is immediately prior to the time point tN−1, and the time point tN−1. In step 182, the log extracting unit 56 obtains, from the log storage unit 34A, log messages included in the time period of the generation S2 obtained in step 180. In step 184, the log extracting unit 56 outputs the log messages, obtained in step 182, as a past log L2. As illustrated in FIG. 13, each of the log messages in the past log L2 includes information of the ID of the corresponding log message, the type thereof, a time point (the time point at which an operation was performed), and specific content (body).

The processes in steps 174 and 180 in FIG. 12 are examples of processing performed by a determination unit according to the technology disclosed herein. The generation S1 and the generation S2 are examples of a first time period and a second time period, respectively, according to the technology disclosed herein. The processes in steps 176 and 182 in FIG. 12 are examples of processing performed by an extracting unit according to the technology disclosed herein. The current log L1 and the past log L2 are examples of a first state data set and a second state data set, respectively according to the technology disclosed herein.

In step 86 described above and illustrated in FIG. 5, the first association analyzing unit 58S1 extracts an appearance pattern of the log messages in the current log L1. As a result, an appearance pattern M1 is obtained, as illustrated in FIG. 13. Specifically, the appearance pattern M1 includes "1", which indicates a type (type01) in the current log L1, as the type of log message that appears first and "2", which indicates a type (type02) in the current log L1, as the type of log message that appears next. The identification information (ID) of the appearance pattern of the log messages is R01.

In step 88, the second association analyzing unit 58S2 extracts an appearance pattern of the log messages in the past log L2. As a result, an appearance pattern M2 is obtained. First, the appearance pattern M2 includes "1", which indicates the type (type01) in the past log L2, as the type of log message that appears first and "2", which indicates the type (type02) in the past log L2, as the type of log message that appears next. The identification information (ID) of the appearance pattern of this log message is R01. Second, the appearance pattern M2 includes "2", which indicates the type (type02) in the past log L2, as the type of log message that appears first and "3", which indicates a type (type03) in the past log L2, as the type of log message that appears next. The identification information (ID) of the appearance pattern of the log messages is R02. Third, the appearance pattern M2 includes "3", which indicates the type (type03) in the past log L2, as the type of log message that appears first and "4", which indicates a type (type04) in the past log L2, as the type of log message that appears next. The identification information (ID) of the appearance pattern of the log messages is R03.

In the above-described example, the types of two consecutive log messages are used as elements for identifying the appearance pattern. However, a number of types of consecutive log messages within a predetermined time, the number being larger than 2 (for example, the number being 3, 4, 5, . . . ), may also be used as elements for identifying the appearance pattern.

In step 90 in FIG. 5, the association comparing unit 60 performs association comparison. That is, the association comparing unit 60 obtains a difference between the appearance pattern M1 and the appearance pattern M2. The appearance pattern M1 does not include the pattern (R02), in which the log message 3 appears after the log message 2, and the pattern (R03), in which the log message 4 appears after the log message 3, the patterns (R02 and R03) being included in the appearance pattern M2. This situation may be determined to be anomalous. If there is no error in the operations and settings even when a system configuration change occurs in the manner described above, it is presumed that the appearance patterns M1 and M2 are the same. However, when the appearance pattern M1 does not include a pattern that exists in the appearance pattern M2, as illustrated in FIG. 13, it may be determined that an event that is different from those in the previous generation S2 has occurred. Similarly, when the appearance pattern M1 includes a new pattern that does not exist in the appearance pattern M2, it may be determined that an event that is different from those in the previous generation S2 has occurred.

The association comparing unit 60 then stores, in the secondary storage device 34, information about the detected anomalies, specifically, IDs R02 and R03 for identifying the appearance patterns.

The process in step 90 in FIG. 5 is an example of processing performed by a determining unit according to the technology disclosed herein.

Next, a description will be given of advantages of the present embodiment.

First Advantage

In the embodiment described above, the occurrence of an anomaly is determined from a difference between the appearance pattern of log messages in the most-recent generation 51 and the appearance pattern of log messages in the second generation S2. This makes it possible to detect an anomaly that is not determinable from log messages in a single generation. That is to say, for example, in anomaly detection for detecting an anomaly by finding an abrupt change in certain performance data, since only one event is extracted, it is difficult to detect an anomaly that is determined from a difference in the pattern between generations. In the present embodiment, however, since a determination is made as to the occurrence of an anomaly that can be determined from a difference in the pattern between generations, it is possible to detect an anomaly that is not determinable from log messages in a single generation.

Second Advantage

In the present embodiment, a generation including the current time point tN is used as the most-recent generation S1. This makes it possible to detect a current anomaly in the processing system 14 to be monitored.

Third Advantage

In the present embodiment, a plurality of interval times between given change time points and other change time points are determined. Then, an elapsed time from a change time point to the current time point is sectioned by using an interval time that can be determined to be most likely to be correct among the determined interval times, to thereby generate generations. The turns of the generations are time points at which system configuration changes are made. Log messages obtained up to the current time point are divided according to the generations. Thus, since the occurrence of an anomaly is determined from a difference between the appearance patterns of log messages, it is possible to appropriately divide the log messages obtained up to the current time point. In particular, in the score calculation processing illustrated in FIG. 10, a difference between the appearance patterns of specific log messages in interval times before and after a given time point is obtained, and a determination is made as to whether or not the interval times are the correct interval time. Thus, it is possible to determine a more accurate interval time.

Next, a description will be given of modifications of the present embodiment.

(First Modification)

In the embodiment described above, the occurrence of an anomaly is determined based on a difference between the appearance pattern of log messages in the most-recent generation S1 and the appearance pattern of log messages in the second generation S2, as illustrated in FIGS. 13 and 14A. Thus, a current anomaly is detected by comparison with the immediately preceding state in which a system configuration change was made. However, in the technology disclosed herein, the occurrence of an anomaly may also be determined based on a difference between the appearance pattern of log messages in the most-recent generation S1 and the appearance pattern of log messages in a plurality of generations Sn before the most-recent generation S1, as illustrated in FIG. 14B. A current anomaly may also be determined by comparison with a state in a longer time period that is earlier than a system configuration change time point.

(Second Modification)

In the embodiment described above, an anomaly is determined based on a difference between the appearance pattern of log messages in the most-recent generation S1 and the appearance pattern of log messages in the second generation S2. Through the determination, a current anomaly is determined. In the technology disclosed herein, however, the occurrence of an anomaly may also be determined based on a difference between the appearance pattern of log messages in a selected first generation prior to the most-recent generation and the appearance pattern of log messages in a second generation earlier than the first generation. This makes it possible to determine an anomaly in the selection generation. In this case, first, a plurality of generations may also be used as the second generation, as in the first modification described above. Second, the second generation may be a generation immediately prior to the first generation or may be a generation earlier than the immediately prior generation.

(Third Modification)

In the embodiment described above, only the types of log messages that have appeared are used as elements for determining the appearance pattern of log messages. In the technology disclosed herein, statistical values of times between appeared log messages may be used as additional elements for determining the appearance pattern, as illustrated in FIGS. 15B and 15C. Average values or standard deviations may be used as the statistical values. With such a scheme, patterns can be determined more specifically, and an anomaly based on a difference between the patterns can be determined more accurately.

FIG. 15B illustrates an example of an appearance pattern extracted from log messages in a current log L1 (for example, FIG. 15A). That is, a first pattern is a pattern in which a log message of type (type02) appears after a log message of type (type01). In addition, there is a pattern P1 in which the average of the interval times of occurrence of two log messages is 1 minute and the standard deviation thereof is 0 minute. A second pattern is a pattern in which a log message of type (type03) appears after a log message of type (type02). In addition, there is a pattern P2 in which the average of the interval times of occurrence of two log messages is 0 minute and the standard deviation thereof is 0 minute. A third pattern is a pattern in which a log message of type (type04) appears after a log message of type (type03). In addition, there is a pattern P3 in which the average of the interval times of occurrence of two log messages is 1.5 minutes and the standard deviation thereof is 0.7 minute.

FIG. 15C illustrates an appearance pattern extracted from log messages in the past log L2. That is, there is a first pattern in which a log message of type (type02) appears after a log message of type (type01). There is a pattern P1 in which the average of the interval times of occurrence of two log messages is 1 minute and the standard deviation thereof is 0 minute. There is a second pattern in which a log message of type (type04) appears after a log message of type (type03). In addition, there is a pattern P4 in which the average of the interval times of occurrence of two log messages is 10 minutes and the standard deviation thereof is 15 minutes.

The generation-matching-degree calculating unit 54 obtains a difference between an appearance pattern extracted from the log messages in the current log L1 and an appearance pattern extracted from the log messages in the past log L2. The result indicates that the pattern P1 (FIG. 15B) in the appearance pattern extracted from the log messages in the current log L1 and the pattern P1 (FIG. 15C) in the appearance pattern extracted from the log messages in the past log L2 are the same.

However, first, the appearance pattern extracted from the log messages in the current log L1 includes the pattern P2 that does not exist in the appearance pattern extracted from the log messages in the past log L2. This situation may be determined to be anomalous. The pattern P2 is identified by R02.

Second, each of the appearance patterns extracted from the log messages in the current log L1 and the past log L2 includes the pattern in which a log message of type (type04) appears after a log message of type (type03). However, both of the patterns are different from each other in the average and the standard deviation of the interval times of occurrence. Thus, this situation may also be determined to be anomalous. These patterns are identified by R03.

Thus, as illustrated in FIG. 15D, the association comparing unit 60 stores, in the secondary storage device 34 as information about an anomaly that is occurring, R02 indicating that an anomaly in which patterns that are different from each other in only the presence/absence of log messages that are determined from the types is occurring. The association comparing unit 60 stores, in the secondary storage device 34 as information about the anomaly that is occurring, R03 indicating that an anomaly in which the types are the same but the statistical values are different from each other is occurring.

(Fourth Modification)

As described above, after the regular interval time is determined as the interval time T in $L_{current}$ assigned to $L_{max}$, the generation creation unit 52 executes the following processing. That is, each time the regular interval time passes from the start time point tN−1 (the latest configuration change time point) of the most-recent generation S1 to which the current time point tN (see FIG. 13) belongs, the generation creation unit 52 newly determines the most-recent generation S1 and the second generation S2. The individual units 56 to 60 illustrated in FIG. 3 execute the processes in steps 84 to 90 in FIG. 5 on the newly determined most-recent generation S1 and second generation S2. In first and second cases described below, the individual units 56 to 60 may also execute processes that are analogous to those described above. That is, the first case is a case in which the data about the latest configuration change time point and data about the regular interval time are input from the processing system 14. The second case is a case in which the operator of the monitoring apparatus 12 learns information of the latest configuration change time point and information of the regular interval time from the user of the processing system 14 and inputs data via the input device 46. In each of the first and second cases, in step 172 in FIG. 12, the log extracting unit 56 obtains, as the generation information, the latest configuration change time point and a time point that is earlier than the latest configuration change time point by an amount corresponding to the regular interval time.

(Fifth Modification)

When the processing system 14 newly transmits the change time point at which a system configuration change was completed to the monitoring apparatus 12, the individual units 52 to 60 may also execute the processes illustrated in FIG. 5 on generations including the new change time point.

(Sixth Modification)

In the embodiment described above, the monitoring apparatus 12 monitors one processing system 14. In the technology disclosed herein, however, the monitoring apparatus 12 may individually monitor a plurality of processing systems 14. That is, each of the processing systems 14 associates the IDs for identifying the respective processing systems 14 with log messages and transmits the associated IDs and log messages to the monitoring apparatus 12. Based on the IDs, the monitoring apparatus 12 identifies the log messages, transmitted from the respective processing systems 14, in correspondence with the processing systems 14. The monitoring apparatus 12 then stores the identified log messages in the log storage unit 34A. Each processing system 14 associates data about the change time point at which a system configuration change was completed with the ID for identifying the corresponding processing system 14 and transmits the associated data and ID to the monitoring apparatus 12. The individual units 52 to 60 then execute the processes in FIG. 5, based on the data and ID transmitted from the processing system 14.

(Seventh Modification)

In the embodiment described above, the communication control unit 48 (FIG. 2) receives log messages transmitted from the individual processing apparatuses 16, 18, . . . , and 20. The received log messages are stored in the log storage unit 34A in the secondary storage device 34. The technology disclosed herein may also employ the following scheme. That is, another apparatus that is different from the monitoring apparatus 12 receives log messages transmitted from the individual processing apparatuses 16, 18, . . . , and 20. The monitoring apparatus 12 may capture all of the log messages, transmitted from the individual processing apparatuses 16, 18, . . . , and 20 and received by the other apparatus, at once and may store the log messages in the log storage unit 34A in the secondary storage device 34.

All the literature, patent applications, and technical standards cited herein are incorporated herein by reference to the same extent as if the individual literature, patent applications, and technical standards were specifically and individually incorporated herein.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A determination method executed by a system that includes a computer and a monitoring apparatus that determines whether there is a failure in the computer, the method comprising:
   obtaining, by a first processor included in the computer, history information including a plurality of change time points indicating times at which a system configuration of the computer was changed;
   transmitting the obtained history information to the monitoring apparatus;
   extracting, by a second processor included in the monitoring apparatus, a plurality of combinations of two changing time points from among the plurality of changing time points; calculating a plurality of interval times indicating candidates of an interval of time of system configuration change time points by calculating a difference between the two changing time points for each of the plurality of combinations;
   obtaining an oldest time point at which an oldest operation has been performed from the history information;
   calculating a score indicating a degree of certainty of the interval of time of system configuration change time points using the oldest time points and an earlier time point of the two changing time points for each of the plurality of interval times;
   specifying the interval of time of system configuration change time points based on the score calculated for each of the plurality of interval times;
   determining a first time period later than a latest change time point extracted from the history information, and a second time period earlier than the first time period and including the latest change time point, based on the specified interval of time of system configuration change time points;
   obtaining, from the computer, log messages including a history of operations performed at the computer and operation time points corresponding to the operations;
   extracting, from the log messages, a first appearance pattern indicating a pattern of operations which appeared in the first time period and a second appearance pattern indicating a pattern of operations which appeared in the second time period;
   determining whether a failure of the computer due to a change of the system configuration occurred in the first time period, based on a difference between the first appearance pattern and the second appearance pattern; and
   transmitting a notification indicating an occurrence of the failure to the computer when it is determined that the failure of the computer has occurred within the first time period;
   receiving, by the first processor included in the computer, the notification; and
   detecting a current anomaly by referring to the received notification,
   wherein the detected current anomaly is either a first anomaly originating from a fault of hardware of the computer, a second anomaly originating a bug included in software of the computer, or a third anomaly which is a combination of the first anomaly and the second anomaly.

2. The determination method according to claim 1, wherein the specifying of the interval of time of system configuration change time points includes determining, a difference whose integer multiple matches the interval between the oldest time point of the oldest operation and the current time point among the plurality of differences.

3. The determination method according to claim 1, wherein a length of the second time period is equal to the interval of time of system configuration change time points.

4. The determination method according to claim 1, wherein the extracting from the log messages, includes extracting the first appearance pattern and the second appearance pattern identified based on types of operations.

5. The determination method according to claim 3, wherein the extracting from the log messages, includes extracting the first appearance pattern and the second appearance pattern identified based on types of the operations and statistical values of time intervals of the operations.

6. The determination method according to claim 1, wherein the determining includes determining that a failure occurred in the first time period, when a pattern that does not exist in the second appearance pattern is detected from the first appearance pattern.

7. The determination method according to claim 1, wherein the determining whether the failure occurred includes:
   counting the number of patterns that do not exist in the second appearance pattern; and
   determining whether the failure occurred in the first time period, based on a value obtained by the counting.

8. The determination method according to claim 1, wherein the change time points included in the history information do not represent all change time points.

9. The determination method according to claim 1, wherein the second time period includes a plurality of timing at which the system configuration of the computer was changed.

10. The determination method according to claim 5, wherein the statistical values are combination of an average value and a standard deviation of the time intervals of the operations.

11. The determination method according to claim 1, wherein the score is a value indicating whether or not segmentation points generated for each of the plurality of interval times agree with the system configuration change time points.

12. The determination method according to claim 1, wherein the score is a number of anomalies that have occurred after the changing of the system configuration.

13. A system, comprising:
   a computer that includes a first processor; and
   a monitoring apparatus coupled to the computer, the monitoring apparatus including:
   a memory; and
   a second processor coupled to the memory and configured to:

obtain, from the computer, history information including a plurality of change time points indicating times at which a system configuration of the computer was changed, extract a plurality of combinations of two changing time points from among the plurality of changing time points;

calculate a plurality of interval times indicating candidates of an interval of time of system configuration change time points by calculating a difference between the two changing time points for each of the plurality of combinations;

obtain an oldest time point at which an oldest operation has been performed from the history information;

calculate a score indicating a degree of certainty of the interval of time of system configuration change time points using the oldest time points and an earlier time point of the two changing time points for each of the plurality of interval times;

specify the interval of time of system configuration change time points based on the score calculated for each of the plurality of interval times;

determine a first time period later than a latest change time point extracted from the history information, and a second time period earlier than the first time period and including the latest change time point, based on the specified interval of time of system configuration change time points;

obtain, from the computer, log messages including a history of operations performed at the computer and operation time points corresponding to the operations, extract, from the log messages, a first appearance pattern indicating a pattern of operations which appeared in the first time period and a second appearance pattern indicating a pattern of operations which appeared in the second time period, determine whether a failure of the computer due to a change of the system configuration occurred in the first time period, based on a difference between the first appearance pattern and the second appearance pattern, and transmit a notification indicating an occurrence of the failure to the computer when it is determined that the failure of the computer has occurred within the first time period, wherein the first processor included in the computer is configured to:

receive the notification; and detect a current anomaly by referring to the received notification, wherein the detected current anomaly is either a first anomaly originating from a fault of hardware of the computer, a second anomaly originating from a bug included in software of the computer, or a third anomaly which is a combination of the first anomaly and the second anomaly.

14. The system according to claim 13, wherein the processor is configured to determine, as the interval of time of system configuration change time points, a difference whose integer multiple matches the interval between the oldest time point of the oldest operation and the current time point among the plurality of differences.

15. A non-transitory computer-readable recording medium storing a program that causes a processor to execute a process, the process comprising:

obtaining, from a computer, history information including a plurality of change time points indicating times at which a system configuration of the computer was changed;

extracting a plurality of combinations of two changing time points from among the plurality of changing time points;

calculating a plurality of interval times indicating candidates of an interval of time of system configuration change time points by calculating a difference between the two changing time points for each of the plurality of combinations;

obtaining an oldest time point at which an oldest operation has been performed from the history information;

calculating a score indicating a degree of certainty of the interval of time of system configuration change time points using the oldest time points and an earlier time point of the two changing time points for each of the plurality of interval times;

specifying the interval of time of system configuration change time points based on the calculated score for each of the plurality of interval times;

determining a first time period later than a latest change time point extracted from the history information, and a second time period earlier than the first time period and including the latest change time point, based on the specified interval of time of system configuration change time points;

obtaining, from the computer, log messages including a history of operations performed at the computer and operation time points corresponding to the operations;

extracting, from the log messages, a first appearance pattern indicating a pattern of operations which appeared in the first time period and a second appearance pattern indicating a pattern of operations which appeared in the second time period;

determining whether a failure of the computer due to a change of the system configuration occurred in the first time period, based on a difference between the first appearance pattern and the second appearance pattern; and transmitting a notification indicating an occurrence of the failure to the computer when it is determined that the failure of the computer has occurred within the first time period, wherein the computer is configured to:

receive the notification; and detect a current anomaly by referring to the received notification, wherein the detected current anomaly is either a first anomaly originating from a fault of hardware of the computer, a second anomaly originating from a bug included in software of the computer, or a third anomaly which is a combination of the first anomaly and the second anomaly.

* * * * *